United States Patent [19]

Chuang et al.

[11] Patent Number: 4,981,659

[45] Date of Patent: Jan. 1, 1991

[54] REDUCTION OF NITROGEN OXIDES

[75] Inventors: Karl T. Chuang; Long Fu, both of Edmonton, Canada

[73] Assignee: Atomic Energy of Canada Limited, Ottawa, Canada

[21] Appl. No.: 450,431

[22] Filed: Dec. 14, 1989

[30] Foreign Application Priority Data

Dec. 14, 1988 [CA] Canada ................................ 585861

[51] Int. Cl.$^5$ .......................... C01B 21/00; C01C 1/00
[52] U.S. Cl. .................................... 423/235; 423/351; 423/352
[58] Field of Search ........................ 423/351, 235, 352

[56] References Cited

U.S. PATENT DOCUMENTS

| | | |
|---|---|---|
| 2,975,025 | 3/1961 | Cohn et al. |
| 3,567,367 | 3/1971 | Kandell et al. |
| 3,953,566 | 4/1976 | Gore |
| 4,025,560 | 5/1977 | Rolston et al. |
| 4,157,315 | 6/1979 | Michaels et al. ................ 423/239 |
| 4,197,272 | 4/1980 | Tighe ................................ 422/180 |
| 4,206,081 | 6/1980 | Inaba et al. ..................... 252/440 |
| 4,213,944 | 7/1980 | Azuhata et al. ................. 423/351 |
| 4,331,520 | 5/1982 | Juda et al. |
| 4,471,014 | 9/1984 | den Hartog et al. |
| 4,507,271 | 3/1985 | Van Deyck et al. |
| 4,631,263 | 12/1986 | Mizumoto et al. .............. 502/159 |
| 4,652,537 | 3/1987 | Tamura et al. |
| 4,732,743 | 3/1988 | Schmidt et al. .................. 423/235 |
| 4,748,012 | 5/1988 | Weber et al. |
| 4,778,665 | 10/1988 | Krishnamurthy et al. ........ 423/235 |
| 4,789,531 | 12/1988 | Eichholtz et al. ................ 423/351 |

FOREIGN PATENT DOCUMENTS

| | | | |
|---|---|---|---|
| 597493 | 5/1960 | Canada. | |
| 607021 | 10/1960 | Canada. | |
| 608685 | 11/1960 | Canada. | |
| 623255 | 7/1961 | Canada. | |
| 637798 | 3/1962 | Canada. | |
| 717906 | 9/1965 | Canada. | |
| 812702 | 5/1969 | Canada. | |
| 975537 | 10/1975 | Canada. | |
| 992057 | 6/1976 | Canada. | |
| 996333 | 9/1976 | Canada. | |
| 1007034 | 3/1977 | Canada. | |
| 1002731 | 1/1987 | Canada. | |
| 0015585 | 9/1980 | European Pat. Off. | |
| 0286967 | 0/0000 | European Pat. No. ........... 3/34 |
| 0246031 | 0/0000 | European Pat. No. ........... 3/36 |
| 0052446 | 0/0000 | European Pat. No. ........... 31/00 |
| 0057990 | 0/0000 | European Pat. No. ........... 31/06 |
| 2255104 | 0/0000 | France ..................... B01DJ/37/02 |
| 2369870 | 0/0000 | France ............................ B01DJ |
| 2426698 | 0/0000 | German .................. B01DJ 21/08 |
| 1388285 | 0/0000 | Great Britain ............. C22 19/00 |

OTHER PUBLICATIONS

WO86/05710 published Oct. 9, 1986.
*Chemical Abstracts,* Vol. 81, 1974, page 331, Abstract No. 158207e, Columbus, Ohio, US; & JP-A-74 18 785 (Fuji Electric Co. Ltd.) 28-02-1974.
*Chemical Abstracts,* Vol. 91, 1979, page 284, Abstract No. 95981m, Columbus, Ohio, US; & JP-A-79 26 986 (Matsushita Electric Industrial Co. Ltd.) 28-02-1979.
English Abstract of EP 0286967.
English Abstract of DE 2426698.

*Primary Examiner*—Wayne A. Langel
*Attorney, Agent, or Firm*—Burns, Doane, Swecker & Mathis

[57] ABSTRACT

A process is disclosed for reducing nitrogen oxides by passing them in admixture with ammonia or hydrogen over a group VIII metal catalyst on a hydrophobic support. The process is carried out at 0°–200° C. when hydrogen is used, or 100°–200° C. when ammonia is used. It is useful in pollution control, for example in reducing nitrogen oxide emissions in industrial waste gases.

19 Claims, No Drawings

REDUCTION OF NITROGEN OXIDES

This invention relates to the reduction of oxides of nitrogen over a catalyst comprising at least one Group VIII noble metal, in which the reduction is carried on at temperatures from about 0° C. to about 200° C.

BACKGROUND OF THE INVENTION

Nitrogen oxides are common pollutants and are widely found in industrial waste gases. Such oxides form a very important environmental problem and are a contributor, along with sulfur oxides, to environmental degradation through the climatic process known as "acid rain". Therefore, for environmental reasons, control of nitrogen oxides is very important.

Typically, nitrogen oxides are removed from industrial waste gases by catalytic reduction to nitrogen and water. However, for such processes to function properly, it is necessary to maintain the waste gas at a relatively high temperature, for example about 700°-900° F. An example of one such process is shown in U.S. Pat. No. 3,567,367 of Kandell et al.

The use of a high temperature process such as shown in the Kandell patent has many disadvantages. Usually, fuel must be expended to keep the gases to be treated in the operating temperatures range. Once the gases have been passed over the catalyst, it is then necessary either to vent hot gas (with the concomitant loss of heat) or else to supply expensive waste heat recovery apparatus.

It is not possible to run conventional processes at ambient temperatures, because the catalyst rapidly becomes poisoned if there is any moisture in the gas stream being treated.

The invention permits reduction of nitrogen oxides at ambient or near ambient temperatures and pressures, although it can also operate at slightly elevated temperatures and pressures if desired. A particular advantage of the invention is that it permits reduction of nitrogen oxides even when oxygen is present, provided that the operating conditions are chosen correctly as discussed below.

The invention makes use of noble metal catalysts on a hydrophobic support. Hydrophobic catalyst supports are already known for other purposes. For example, U.S. Pat. No. 4,025,560 of Rolston et al. shows a catalyst for the exchange of hydrogen isotopes between a gas stream and a water stream, where the catalyst support is an inherently hydrophobic material such as cubes of polytetrafluoroethylene (PTFE), polyethylene or the like. European Patent application No. 0015585 of Hitachi Inc. shows catalysts similar to those of Rolston for other types of gas-liquid reactions. An activated carbon catalyst, which has been reacted with a monomer which forms hydrophobic polymers, is disclosed for carbon monoxide oxidation in U.S. Pat. No. 4,652,537 of Tamura.

Catalysts on hydrophobic supports have not previously been proposed for the reduction of nitrogen oxides. However, it has now been discovered that they have particular advantages in the reduction of nitrogen oxides, in that they will function at lower temperatures than known catalysts, thus avoiding the necessity of pre-heating the gas to be treated. Thus, the present process can be carried out at temperatures between 0° and 200° C. At such temperatures these catalysts also function in the presence of oxygen, selectively to reduce nitrogen oxides instead of oxygen. If there is oxygen present, some oxygen will be reduced, and this effect increases with increasing oxygen concentration. However, oxygen concentrations of up to 100 times the concentration of hydrogen, on a volume % basis, and which do not exceed 20% by volume of the feed gas, do not cause severe loss of selectivity at the temperatures of this process.

BRIEF DESCRIPTION OF THE INVENTION

The invention relates to a process for reducing nitrogen oxides, by passing a gas stream containing nitrogen oxides and hydrogen or ammonia over a catalyst. The catalyst is formed from at least one Group VIII metal on a hydrophobic support. The reaction is carried out at a temperature between about 0° C. and about 200° C. if the reducing agent is hydrogen and about 100° C. and 200° C. if the reducing agent is ammonia. If the catalyst support is one which decomposes at under 200° C. when exposed to the gas stream being reduced the temperature should be low enough so that the support is not decomposed.

DETAILED DESCRIPTION OF THE INVENTION

In its general aspect, the invention relates to the treatment of nitrogen oxides with hydrogen or ammonia, over a Group VIII metal deposited on a hydrophobic support. The invention can be used to catalyze the reduction of pure nitrogen oxides if desired. Thus, it is possible to carry out the invention to treat a stream of a pure nitrogen oxide (or a mixture of nitrogen oxides) admixed with hydrogen or ammonia. However, there is little commercial reason to reduce pure nitrogen oxides. The present process has the particular advantage that it can be used to remove nitrogen oxides, even when they are present in small concentrations such as 100 ppm., from a waste gas which also contains many other components.

In this disclosure, the term "nitrogen oxides", or the symbol $NO_x$, is intended to include one or more of the species NO, $NO_2$, $N_2O_5$ and $N_2O$. Depending on the abundance of free oxygen and the temperature and pressure, these species interconvert, so that what is usually present is a mixture of various species. For simplicity, most of the examples use a gas stream into which NO has been injected. However, other species form in situ, so what is being reduced is a mixture of oxides of nitrogen.

In a particularly desirable embodiment, the invention is applicable to the treatment with hydrogen of waste gases or other gases containing nitrogen oxides. When used for pollution control, the nitrogen oxides should be present in a concentration of less than 1.5% of the feed gas by volume, and particularly preferably in a concentration of less than 3000 ppm. If nitrogen oxides are present in larger concentrations, the reaction will still occur, but there will be a greater likelihood that the effluent gas will still contain some nitrogen oxides, which is undesirable in a pollution control process. The hydrogen should be present in stoichiometric excess to the nitrogen oxide and preferably in considerable stoichiometric excess (for example 5 times or more) to ensure complete reaction. Preferably, the hydrogen is present in amounts of above 0.5% of the feed gas. Other components of the feed gas stream can include $N_2$, $CO_2$, $O_2$, $H_2O$ or CO (which will of course be oxidized to $CO_2$ if $O_2$ is present). Oxygen (if present) is present in a concentration less than 100 times the concentration of hydrogen present on a volume % basis and less than 20% of the overall feed stream. Preferably, at least 80% of the feed gas is a gas, such as $N_2$ or $CO_2$, which is inert under the reaction conditions and $H_2$ and $O_2$ concentrations are adjusted, and water vapour added if necessary, so that the $H_2$ and $O_2$ do not form an explosive mixture. It is preferred that no more than about 200 ppm $SO_2$ be present in the feed gas, as $SO_2$ will reduce the catalyst activity while it is flowing over the catalyst. However, this inactivation is reversed when a feed gas which does not contain $SO_2$ is supplied to the catalyst.

The pressure at which the process is carried out is not critical. Superatmospheric pressures can be used if desired. However, the process works satisfactorily at atmospheric pressure, and it is preferred to carry it out at atmospheric pressure as simple apparatus can be used. There is no particular advantage to using subatmospheric pressure, and care must be taken if such pressures are used to have a sufficient concentration of reactants so that the reaction proceeds at a reasonable rate.

The present process can be used as part of an overall pollution control process, for the treatment of stack gases or other gaseous effluents containing $SO_2$, CO and nitrogen oxides which must be removed before the gas can be vented. In such a pollution control process, the $SO_2$ is first reduced to below 200 ppm, using a conventional $SO_2$ removal process. In a subsequent stage, the CO and any hydrocarbons present are oxidized. Conveniently such oxidation can take place using the process disclosed in Chuang et al. published European application No. 0,246,031 published on Nov. 19, 1987. Once the CO and hydrocarbons have been oxidized the effluent is treated using the present process to remove the nitrogen oxides.

The catalyst for the present process is deposited on a hydrophobic support. The hydrophobic support must have a surface area of at least 50 meters per gram, and can have a surface area as high as 1,500 meters per gram. It can be selected from the group of inherently hydrophobic plastic materials such as styrene divinylbenzene ("SDB"), polytetrafluroroethylene ("PTFE"), polyethylene or polypropylene or silicalite (a silica having a highly structured lattice which is described in U.S. Pat. No. 4,061,724 dated Dec. 6, 1977). Alternatively, the hydrophobic support can be an initially hydrophilic material which has been chemically treated as to render it hydrophobic. For example, silica, carbon or fumed silica (such as that produced by Cabot Corp. under the name CAB-O-SIL EH-5) can be rendered hydrophobic by treatment with a silane, or fluorine. Treatment with tetrafluoroethylene monomer can also be used to render the support hydrophobic, in the case of those supports which from sufficiently strong bonds with tetrafluoroethylene.

One convenient way of determining the hydrophobicity of a solid material, and hence its suitability as a support, is by measuring its "contact angle" according to Young's Theory. The support materials which are useful must have a contact angle of at least 30°, although materials with a contact angle of at least 50° are preferred. For best results, a material with a contact angle of at least 90° is preferred.

The support material can be present as discrete particles or granules, or it can be deposited on a second support such as a ceramic or a metal screen. For example, the support material can be deposited on conventional ceramic beads, saddles or rings. Preferably, the discrete particles of the hydrophobic support material can be attached to the second support by means of a coating of an organic resin or polymer which is liquid-water-repellent and water vapor permeable, such as for example polytetrafluoroethylene or a silicone. Suitable silicones for example, are poly-siloxanes such as polyalkylsiloxanes. The silicone may also include at least one substituent selected from the ethyl, propyl, isopropyl and t-butyl groups.

The catalyst is a Group VIII metal, with Pt or Pd or Ru being preferred. If desired, the catalyst may be a mixture of Pt, Pd or Ru with each other or with another metal from group VIII such as Rh or Ir. It is preferred that the other metal be present in a lesser amount by weight than the Pt, Pd or Ru. Depending on which catalyst is used and the temperature of the feed gas, the product of the reduction will be predominantly either nitrogen or ammonia.

The Group VIII noble metal is deposited on the hydrophobic support material in known manner, as by slurrying the support material in a solution of a chloride of the desired Group VIII metal.

When the reaction is carried out using NO and $H_2$ the product of the reduction can be either nitrogen or ammonia. At the high end of the temperature range of the process (i.e. from about 75° C. to 200° C.) the product is substantially completely nitrogen, with only traces of ammonia. At lower temperatures, more ammonia is produced. The choice of catalyst also affects the product. Generally, at a given temperature, Pt tends to give yield more $NH_3$ as a product, whereas other group VIII noble metals, such as Pd or Rh, yield nitrogen. If the feed gas contains a substantial excess of oxygen over $NO_x$ (for example molar ratios of over about 50 to 1) the product may also contain some $N_2O$.

At temperatures of 100°-200° C., ammonia can be used instead of $H_2$ as the reducing agent. The product is $N_2$, although some $N_2O$ may be present if the feed gas contains a substantial molar excess of oxygen over $NO_x$. The invention will be further illustrated in the particular examples which follow.

EXAMPLES

EXAMPLE 1

A commercially available mixture of 50% by weight divinylbenzene and 50% by weight ethylvinylbenzene (available from Fluka Chemical Corp.) was combined with an equal weight of 2-methylpentanol (obtained from Alfa Products Division, Morton Thiokol Corp.). To the resulting solution was added 0.4% by weight of 2,2-azobis(2-methylpropronitrile). The solution was heated in a water bath at 85° C. to prepare a block of solid porous styrene-divinylbenzene polymer (SDB) having a surface area of 465 $m^2/g$. The block was then crushed and heated to 250° C. under helium to remove the 2-methylpentanol. The product was then sieved to provide a porous SDB powder with a size from 14 mesh to 8 mesh (U.S. Sieve Sizes).

The powder was ethanol washed and was then slurried in ethanol containing dissolved $H_2PtCl_6$. The length of time of slurrying and the concentration of the solution were adjusted to give product having a platinum loading of 2% weight percent Pt. The resulting platinized material had a bulk density of 0.4 $g/cm^3$. The platinized material was then rotary evaporated at 95° C. under a slight vacuum to remove the alcohol, and was heated in air at 105° C. for one hour. Subsequently, it was reduced in hydrogen at 200° C. until the pH measured at the furance outlet became neutral.

16 gm of the impregnated catalyst was placed in a reactor formed of ⅜ inch PYREX (T.M.) heat resistant tubing. A feed gas consisting of 1% hydrogen, 3.4% oxygen and 0.1% NO by volume with the balance being nitrogen, was passed through the reactor at atmospheric pressure. The flow rate was a standard volume of 3,000 liters per hour. The reactor was heated to various temperatures as shown below.

| T °C. | S.V. h$^{-1}$ | [H$_2$] % | [O$_2$] % | Conversion % |
|---|---|---|---|---|
| 25 | 3000 | 1 | 3.4 | 0 |
| 45 | 3000 | 1 | 3.4 | 91 |
| 70 | 3000 | 1 | 3.4 | 90 |
| 87 | 3000 | 1 | 3.4 | 89 |
| 120 | 3000 | 1 | 3.4 | 81 |
| 150 | 3000 | 1 | 3.4 | 70 |

EXAMPLE 2

The procedure of example 1 was followed, except that the catalyst was formed by slurrying the SDB with a mixture of H$_2$PtCl$_6$, and H$_2$IrCl$_6$ in a ratio of 9:1 Pt to Ir content in ethanol. The oxygen volume percent of the mixture was 3.2% but the mixture was otherwise the same as in Example 1. The results of testing at different temperatures were as follows:

| T °C. | S.V. h$^{-1}$ | [H$_2$] % | [O$_2$] % | Conversion % |
|---|---|---|---|---|
| 25 | 3000 | 1 | 3.2 | 75 |
| 55 | 3000 | 1 | 3.2 | 56 |
| 68 | 3000 | 1 | 3.2 | 41 |
| 85 | 3000 | 1 | 3.2 | 20 |

EXAMPLE 3

The same catalyst as was used in example 2 was used with a gas input having a standard volume of 5,000 liters per hour and a concentration of 1% hydrogen, 3.0% oxygen and 1,000 parts per million of NO. The conversion of NO was measured at start-up and after six hours. The conversion rate of NO remained constant at 88%. The product was nitrogen with traces of NH$_3$. After six hours, liquid water was introduced into the reactor, filling the reactor. The input gas continued to be supplied at 5,000 Standard Volume liters per hour. After 12 hours, conversion was again measured, and was found to be 90%, which is approximately the same as the conversion when no water was present. Therefore, this shows that conversion is essentially independent of the presence of water.

EXAMPLE 4

The procedure of example 2 was repeated, but at a standard volume of 3,000 liters per hour. The temperature at the feed to the reactor and the temperature of the effluent from the reactor were measured, as was the conversion. The product was N$_2$, and no NH$_3$ was observed. The results showed that there is a relatively small temperature increase as a result of the reaction, particularly at slightly elevated temperatures.

| T °C. | T °C. (Effluent) | Conversion % | dT °C. |
|---|---|---|---|
| 22 | 46 | 86 | 24 |
| 44 | 46 | 87 | 2 |
| 53 | 55 | 85 | 2 |
| 59 | 62 | 82 | 3 |
| 65 | 69 | 77 | 4 |
| 78 | 80 | 70 | 2 |

[H$_2$] = 1%
[O$_2$] = 3.2%
S.V. - 3000 h$^{-1}$

EXAMPLE 5

Example 2 was repeated except that a catalyst was 0.5% Pt and 0.5% Ru. The catalyst was prepared by slurrying the SDB in ethanol with solutions of 5 gm/l. of RuCl$_3$ and H$_2$PtCl$_6$ respectively. Runs were carried out at standard volumes of 3,000 liters per hour and 10,000 liters per hour.

The following results were obtained:

| T °C. | S.V. h$^{-1}$ | [H$_2$] % | [O$_2$] % | Conversion % |
|---|---|---|---|---|
| 30 | 3000 | 1 | 3.2 | 6 |
| 52 | 3000 | 1 | 3.2 | 7.5 |
| 65 | 3000 | 1 | 3.2 | 8 |
| 105 | 3000 | 1 | 3.2 | 23 |
| 130 | 3000 | 1 | 3.2 | 48 |
| 138 | 3000 | 1 | 3.2 | 76 |
| 145 | 3000 | 1 | 3.2 | 80 |
| 167 | 3000 | 1 | 3.2 | 83 |
| 30 | 10000 | 1 | 3.2 | 0 |
| 65 | 10000 | 1 | 3.2 | 8 |
| 100 | 10000 | 1 | 3.2 | 10 |
| 125 | 10000 | 1 | 3.2 | 18 |
| 160 | 10000 | 1 | 3.2 | 67 |
| 200 | 10000 | 1 | 3.2 | 57 |

EXAMPLE 6

Example 5 was repeated, using a catalyst having a 5% Pt - 5% Ru loading. The results were as follows:

| T °C. | S.V. h$^{-1}$ | [H$_2$] % | [O$_2$] % | Conversion % |
|---|---|---|---|---|
| 25 | 3000 | 1 | 3.2 | 8.7 |
| 50 | 3000 | 1 | 3.2 | 78 |
| 65 | 3000 | 1 | 3.2 | 76 |
| 90 | 3000 | 1 | 3.2 | 77 |
| 113 | 3000 | 1 | 3.2 | 77 |
| 153 | 3000 | 1 | 3.2 | 71 |
| 167 | 3000 | 1 | 3.2 | 68 |
| 25 | 10000 | 1 | 3.2 | 10 |
| 38 | 10000 | 1 | 3.2 | 25 |
| 54 | 10000 | 1 | 3.2 | 46 |
| 77 | 10000 | 1 | 3.2 | 78 |
| 105 | 10000 | 1 | 3.2 | 78 |
| 130 | 10000 | 1 | 3.2 | 76 |
| 180 | 10000 | 1 | 3.2 | 66 |

EXAMPLE 7

Example 5 was repeated using a catalyst with a 2% Pd - 2% Ru loading. The results were as follows:

| T °C. | S.V. h$^{-1}$ | [H$_2$] % | [O$_2$] % | Conversion % |
|---|---|---|---|---|
| 25 | 3000 | 1 | 3.2 | 4 |
| 37 | 3000 | 1 | 3.2 | 5 |
| 55 | 3000 | 1 | 3.2 | 60 |
| 60 | 3000 | 1 | 3.2 | 66 |
| 95 | 3000 | 1 | 3.2 | 66 |
| 105 | 3000 | 1 | 3.2 | 68 |
| 130 | 3000 | 1 | 3.2 | 74 |
| 155 | 3000 | 1 | 3.2 | 70 |

-continued

| T °C. | S.V. h$^{-1}$ | [H$_2$] % | [O$_2$] % | Conversion % |
|---|---|---|---|---|
| 25 | 10000 | 1 | 3.2 | 2 |
| 60 | 10000 | 1 | 3.2 | 6 |
| 82 | 10000 | 1 | 3.2 | 66 |
| 90 | 10000 | 1 | 3.2 | 70 |
| 110 | 10000 | 1 | 3.2 | 70 |
| 130 | 10000 | 1 | 3.2 | 71 |
| 165 | 10000 | 1 | 3.2 | 69 |

EXAMPLE 8

The procedure of example 2 was repeated, except that the catalyst was 2% Ru (deposited from RuCl$_3$). All runs were carried out at a standard volume of 3,000 liters per hour. The results were as follows:

| T °C. | S.V. h$^{-1}$ | [H$_2$] % | [O$_2$] % | Conversion % |
|---|---|---|---|---|
| 45 | 3000 | 1 | 3.2 | 5 |
| 75 | 3000 | 1 | 3.2 | 10 |
| 120 | 3000 | 1 | 3.2 | 12.5 |
| 167 | 3000 | 1 | 3.2 | 40 |
| 187 | 3000 | 1 | 3.2 | 41 |

EXAMPLE 9

The procedure of example 2 was repeated except that the catalyst was 2% Pd, deposited from PdCl$_3$. The results were as follows:

| T °C. | S.V. h$^{-1}$ | [H$_2$] % | [O$_2$] % | Conversion % |
|---|---|---|---|---|
| 22 | 3000 | 1 | 3.2 | 0 |
| 45 | 3000 | 1 | 3.2 | 21 |
| 70 | 3000 | 1 | 3.2 | 55 |
| 85 | 3000 | 1 | 3.2 | 47 |
| 100 | 3000 | 1 | 3.2 | 45 |
| 140 | 3000 | 1 | 3.2 | 29 |
| 156 | 3000 | 1 | 3.2 | 24 |
| 170 | 3000 | 1 | 3.2 | 22 |

EXAMPLE 10

The procedure of example 5 was repeated, except that the catalyst was 6% Pd and 2% Ru. The results were as follows:

| T °C. | S.V. h$^{-1}$ | [H$_2$] % | [O$_2$] % | Conversion % |
|---|---|---|---|---|
| 25 | 3000 | 1 | 3.2 | 4 |
| 60 | 3000 | 1 | 3.2 | 17 |
| 70 | 3000 | 1 | 3.2 | 63 |
| 97 | 3000 | 1 | 3.2 | 77 |
| 125 | 3000 | 1 | 3.2 | 80 |
| 140 | 3000 | 1 | 3.2 | 82 |
| 177 | 3000 | 1 | 3.2 | 79 |
| 20 | 10000 | 1 | 3.2 | 40 |
| 46 | 10000 | 1 | 3.2 | 70 |
| 60 | 10000 | 1 | 3.2 | 72 |
| 75 | 10000 | 1 | 3.2 | 74 |
| 105 | 10000 | 1 | 3.2 | 78 |
| 145 | 10000 | 1 | 3.2 | 73 |
| 168 | 10000 | 1 | 3.2 | 70 |
| 185 | 10000 | 1 | 3.2 | 67 |

EXAMPLE 11

Fluorinated carbon powder (Allied Chemical Type 2065) having a surface area of 340 m$^2$/g, was slurried with H$_2$PtCl$_6$ in ethanol to give a Pt loading of 10%. The powder was then dried at 200° C. under helium flow and reduced at 200° C. under hydrogen flow. 4 g. of this powder was dispersed with 100 g. of water 16 g. of surfactant (20% Triton X-100 [T.M.] from J. T. Baker Chemical Co.). To this dispersion was added 6.7 g. of polytetrafluoroethylene (PTFE) suspension (du Pont Teflon 30 [T.M.]). The slurry was then added to 174 gm of commercial ¼″ ceramic rings (obtained from Norton Co.) to coat the rings. The PTFE served as a bonding agent to bond the fluorocarbon powder to the rings. The rings were then dried, with the temperature being raised gradually from 60° C. to 365° C., with a final period of 15 minutes at 365° C. to cure the PTFE. Input gas of varying compositions as shown in the following table were passed through this catalyst at temperatures as shown in the table:

| (a) With feed gas containing 2050 ppm NO | | | | |
|---|---|---|---|---|
| T °C. | S.V. h$^{-1}$ | [H$_2$] % | [O$_2$] % | Conversion % |
| 50 | 12000 | 1 | 0.6% | 5 |
| 80 | 12000 | 1 | 0.6 | 70 |
| 100 | 12000 | 1 | 0.6 | 78 |
| 110 | 12000 | 1 | 0.6 | 78 |
| 55 | 12000 | 0.5 | 0.6 | 5 |
| 60 | 12000 | 0.5 | 0.6 | 22 |
| 70 | 12000 | 0.5 | 1.6 | 46 |
| 85 | 12000 | 0.5 | 1.6 | 66 |
| 100 | 12000 | 0.5 | 1.6 | 70 |
| 110 | 12000 | 0.5 | 1.6 | 66 |

| (b) With feed gas containing 660 ppm NO | | | | |
|---|---|---|---|---|
| T °C. | SV/H | [H$_2$] % | [O$_2$] % | Conversion % |
| 35 | 12000 | 1 | 2.5 | 10 |
| 45 | 12000 | 1 | 2.5 | 70 |
| 50 | 12000 | 1 | 2.5 | 75 |
| 60 | 12000 | 1 | 2.5 | 76 |
| 80 | 12000 | 1 | 2.5 | 68 |
| 100 | 12000 | 1 | 2.5 | 65 |
| 50 | 12000 | 0.5 | 2.5 | 15 |
| 60 | 12000 | 0.5 | 2.5 | 55 |
| 85 | 12000 | 0.5 | 2.5 | 65 |
| 90 | 12000 | 0.5 | 2.5 | 62 |

| (c) With feed gas containing 2000 ppm NO | | | | |
|---|---|---|---|---|
| T °C. | SV/H | [H$_2$] % | [O$_2$] % | Conversion % |
| 60 | 12000 | 1.0 | 10 | 22 |
| 62 | 12000 | 1.0 | 10 | 68 |
| 65 | 12000 | 1.0 | 10 | 66 |
| 75 | 12000 | 1.0 | 10 | 58 |
| 80 | 12000 | 1.0 | 10 | 50 |
| 85 | 12000 | 1.0 | 10 | 45 |
| 100 | 12000 | 1.0 | 10 | 32 |
| 70 | 12000 | 0.5 | 10 | 48 |
| 80 | 12000 | 0.5 | 10 | 60 |
| 90 | 12000 | 0.5 | 10 | 58 |
| 95 | 12000 | 0.5 | 10 | 55 |

EXAMPLE 12

Fumed silica (CAB-O-SIL [T.M.] obtained from Cabot Corp. was rendered hydrophobic by treatment with silane. The hydrophobic silica was slurried with H$_2$PtCl$_6$ and PdCl$_3$ to give a Pt loading of 2% and a Pd loading of 4% by weight. It was then mixed with ceramic beads in a weight ratio of 1:9 so that the final Pt-Pd loading was 0.2% and the final Pd loading was 0.4%. Input gases of varying composition, shown in the following table, were passed over this catalyst, with the following results:
Temperature: 25° C. Pressure: Atmospheric
Space velocity 8,400/h.
H$_2$ concentration 1.0 vol. %
O$_2$ concentration 2.5 vol. %

| ppm NO | Conversion |
| --- | --- |
| 100 | 88 |
| 150 | 87 |
| 200 | 82 |
| 275 | 75 |
| 300 | 68 |

It will be noted that, even at 25° C., very good conversion was obtained, although this conversion fell off as the concentration of NO was increased.

EXAMPLE 13

In the examples heretofore, the nitrogen oxide reduced was NO. This is the most widely-found species in industrial stack gases. However, to demonstrate that other nitrogen oxides are also decomposed, the following example was performed. A mixture of nitrogen oxides was obtained by mixing $N_2$ containing 5% NO with air. In this process about 25% of the NO is oxidized to $NO_2$. The mixture was then diluted with $N_2$ to obtain a feedstock having various different concentrations of NO and $NO_x$ (higher nitrogen oxides). The mixture was reduced using the catalyst of Example 10 and the following results were obtained.

| T °C. | $[NO]_{Feed}$ ppm | $[NO_x]_{Feed}$ ppm | Conv. (NO) % | Conv. ($NO_x$) % |
| --- | --- | --- | --- | --- |
| 50 | 650 | 860 | 74 | 72 |
| 60 | 700 | 860 | 71 | 68 |
| 70 | 880 | 1250 | 72 | 78 |
| 90 | 840 | 1150 | 73 | 77 |
| 110 | 840 | 1150 | 75 | 79 |

$[H_2] = 1\%$
$[O_2] = 3.2$
S.V. = $h^{-1}$

EXAMPLE 14

A hydrophobic silica catalyst was formed by treating commercially available silica spheres of $\frac{1}{4}''$ diameter and having a surface area of 1450 m²/g, (obtained from United Catalyst, Inc.,) with silane to render them hydrophobic. A catalyst having 0.1% Pd and 0.15% Ru was obtained by suspending the silica spheres in an aqueous solution of $PdCl_3$ and $RuCl_3$ in a rotating beaker, while an infrared lamp evaporated water from the beaker. The catalyst was then dried in air at 95° C. for 12 hours. It was then soaked in I N NaOH solution and washed with distilled water until no $Cl^-$ ions were found in the water (when tested with $Ag^+$). The catalyst was then dried and reduced in hydrogen at 250° C. for 10 hours. Gas mixtures as shown in the following table were passed through this catalyst at atmospheric pressure in the reactor of Example 1, with the following results:

| T °C. | S.V. $h^{-1}$ | $[H_2]$ % | $[O_2]$ % | Conversion % |
| --- | --- | --- | --- | --- |
| 25 | 3000 | 1 | 3.2 | 74 |
| 45 | 3000 | 1 | 3.2 | 63 |
| 70 | 3000 | 1 | 3.2 | 52 |

EXAMPLE 15

Example 14 was repeated but the hydrophobic silica was slurried with $PdCl_3$ only to give a catalyst with a 2% by weight loading of Pd. Results with this catalyst were as follows:

| T °C. | S.V. $h^{-1}$ | $[H_2]$ % | $[O_2]$ % | Conversion |
| --- | --- | --- | --- | --- |
| 25 | 3000 | 1 | 3.2 | 14 |
| 45 | 3000 | 1 | 3.2 | 89 |
| 70 | 3000 | 1 | 3.2 | 76 |
| 95 | 3000 | 1 | 3.2 | 60 |

EXAMPLE 16

To demonstrate the process of the invention using ammonia as the reducing agent, a catalyst was prepared using SDB particles (prepared as in Example 1) loaded with 0.2 weight percent Pt. The Pt loading was done as set out in Example 1.

16 grams of the impregnated catalyst was placed in a reactor formed of $\frac{3}{8}$ inch PYREX (T.M.) heat resistant tubing. A feed gas which included 2000 ppm NO and 2000 ppm $NH_3$, 4% $O_2$ and balance $N_2$ was passed through the reactor at a standard volume of 5,000 liters per hour. The reactor was heated to 170° C. The NO leaving the reactor was monitored. It was found that 38% of the NO had been reduced to nitrogen. No $N_2O$ was detected.

It is understood that the invention has been disclosed herein in connection with certain examples and embodiments. However, such changes, modifications or equivalents as can be used by those skilled in the art are intended to be included. Accordingly, the disclosure is to be construed as exemplary, rather than limitative, and such changes within the principles of the invention as are obvious to one skilled in the art are intended to be included within the scope of the claims.

We claim:

1. A process for reducing at least one oxide of nitrogen which process comprises passing said oxide of nitrogen, in admixture with a reducing gas selected from hydrogen and ammonia, into contact with a catalyst comprising at least one catalytically active group VIII metal disposed on a hydrophobic support, at a temperature at which the support remains stable, said temperature being between about 0° C. to 200° C. when said reducing gas is hydrogen, and said temperature being between about 100° C. and 200° C. when said reducing gas is ammonia.

2. A process as claimed in claim 1 in which the hydrophobic support is selected from the group consisting of
   (i) styrene divinylbenzene copolymers
   (ii) polyethylene or polypropylene and copolymers thereof,
   (iii) silica which has been rendered hydrophobic by treatment with a silane, with fluorine or with tetrafluoroethylene monomer
   (iv) polytetrafluoroethylene
   (v) fluorinated carbon or
   (vi) carbon which has rendered hydrophobic by treatment with a silane or with tetrafluoroethylene monomer.

3. A process as claimed in claim 2 in which the porous hydrophobic support has a surface area of from 50 to 1,500 m²/g.

4. A process as claimed in claim 3 in which the feed gas for the process additionally contains a gas which is inert under the conditions of the process.

5. A process as claimed in claim 3 in which the feed gas for the process additionally contains a gas which is inert under the conditions of the process, said oxides of nitrogen are present in a concentration of less than 1½% of the feed gas by volume, and the reducing gas is hydrogen, said hydrogen being present in stoichiometric excess to the nitrogen oxides.

6. A process as claimed in claim 3 in which the feed gas for the process additionally comprises $N_2$, $CO_2$ or a mixture thereof.

7. A process as claimed in claim 3 in which the feed gas for the process additionally comprises $N_2$, $CO_2$ or a mixture thereof and said oxides of nitrogen are present in a concentration of less than 1½% of the feed gas by volume, and the reducing gas is hydrogen, present in stoichiometric excess to the nitrogen oxides.

8. A process as claimed in claim 3 in which the Group VIII metal is selected from Pt, Pd, Ru, Rh, Ir and mixtures of two such metals in which at least one is selected from Pt, Pd and Ru.

9. A process as claimed in claim 3 in which the catalyst is Pt or a mixture of Pt with Pd, or a mixture of Pt and Ir containing with a lesser amount by weight of Ir than Pt.

10. A process as claimed in claim 3 in which the hydrophobic support has a contact angle of at least 30° at the temperature of the process.

11. A process as claimed in claim 3 in which the hydrophobic support has a contact angle of at least 50° at the temperature of the process.

12. A process as claimed in claim 3 in which the hydrophobic support has a contact angle of at least 90° at the temperature of the process.

13. A process for reducing at least one oxide of nitrogen, which comprises passing said oxide of nitrogen in admixture with hydrogen and at least one gas which is inert under the conditions of the process into contact with a catalyst comprising a hydrophobic support and a catalytically active metal selected from Pt, Pd, Ru and mixtures of Pt or Pd with each other or with Ru, Ir or Rh, at a temperature at which the catalyst is stable between 0° C. and 200° C.

14. A process as claimed in claim 13 in which said hydrogen is present in stoichiometric excess to said oxide of nitrogen.

15. A process as claimed in claim 13, in which said nitrogen oxide is present in an amount of less than 1.5% of the feed gas by volume, at least 0.5% of the feed gas is hydrogen, at least 80% of the feed gas is said gas which is inert, and not more than 200 ppm $SO_2$ is present in the feed gas.

16. A process as claimed in claim 13 in which the hydrophobic support is a styrene divinylbenzene copolymer.

17. A process as claimed in claim 13 in which the hydrophobic support has a contact angle of at least 30° at the temperature of the process.

18. A process as claimed in claim 15 in which the hydrophobic support has a contact angle of at least 50° at the temperature of the process.

19. A process as claimed in claim 15 in which the hydrophobic support has a contact angle of at least 90° at the temperature of the process.

* * * * *